US012370824B2

(12) United States Patent
Dvorak et al.

(10) Patent No.: US 12,370,824 B2
(45) Date of Patent: Jul. 29, 2025

(54) COMPOSITE SECURITY ELEMENT

(71) Applicant: IQS GROUP s.r.o., Husinec-Rez (CZ)

(72) Inventors: Robert Dvorak, Prague (CZ); Petr Franc, Caslav (CZ); Roman Houha, Prague (CZ)

(73) Assignee: IQS GROUP s.r.o., Husinec-Rez (CZ)

( * ) Notice: Subject to any disclaimer, the term of this patent is extended or adjusted under 35 U.S.C. 154(b) by 0 days.

(21) Appl. No.: 18/001,745

(22) PCT Filed: Jun. 14, 2021

(86) PCT No.: PCT/EP2021/066002
§ 371 (c)(1),
(2) Date: Dec. 14, 2022

(87) PCT Pub. No.: WO2021/254974
PCT Pub. Date: Dec. 23, 2021

(65) Prior Publication Data

US 2023/0226840 A1 Jul. 20, 2023

(30) Foreign Application Priority Data

Jun. 15, 2020 (GB) .................................... 2009076

(51) Int. Cl.
*B42D 25/328* (2014.01)
*B42D 25/21* (2014.01)
(Continued)

(52) U.S. Cl.
CPC ......... *B42D 25/328* (2014.10); *B42D 25/324* (2014.10); *B42D 25/351* (2014.10);
(Continued)

(58) Field of Classification Search
CPC .. B42D 25/328; B42D 25/324; B42D 25/351; B42D 25/391; B42D 25/455;
(Continued)

(56) References Cited

U.S. PATENT DOCUMENTS

2010/0295290 A1* 11/2010 Muth ...................... B32B 27/36 428/29
2014/0226188 A1 8/2014 Wu et al.

FOREIGN PATENT DOCUMENTS

AU 2008317836 A1 * 5/2010 ......... B29C 45/0003
EP 3528216 8/2019
(Continued)

OTHER PUBLICATIONS

Intellectual Property Office, Search Report, App. No. GB2009076.7 (Dec. 15, 2020).
(Continued)

*Primary Examiner* — Justin V Lewis
(74) *Attorney, Agent, or Firm* — Walters & Wasylyna LLC

(57) ABSTRACT

A security element, e g. for an ID card (7) or passport, banknote, ticket, etc, comprises a plurality of superposed layers (8*a*, 8*b*, 8*c*, 8*d*) and a security image or object (1, 2, 3, 4, 5, 6, 7) comprising a plurality of discrete security components, each said discrete security component constituting or providing a portion of the complete security image or object, which portion is less than the whole of the security image or object, wherein each said discrete security component is provided or formed on or within a respective one of the said plurality of superposed layers of the element (7). The layers can be laminated together. The components can be: a security rainbow hologram/DOVID (1); a tactile security feature (2); a 3D holographic optical element (3); an IR visible printing (4); an UV visible printing (5); a colour switch printing (6).

18 Claims, 5 Drawing Sheets

(51) Int. Cl.

| | |
|---|---|
| ***B42D 25/23*** | (2014.01) |
| ***B42D 25/24*** | (2014.01) |
| ***B42D 25/29*** | (2014.01) |
| ***B42D 25/324*** | (2014.01) |
| ***B42D 25/351*** | (2014.01) |
| ***B42D 25/355*** | (2014.01) |
| ***B42D 25/382*** | (2014.01) |
| ***B42D 25/387*** | (2014.01) |
| ***B42D 25/391*** | (2014.01) |
| ***B42D 25/455*** | (2014.01) |
| ***B42D 25/46*** | (2014.01) |

(52) U.S. Cl.

CPC ......... *B42D 25/391* (2014.10); *B42D 25/455* (2014.10); *B42D 25/46* (2014.10); *B42D 25/21* (2014.10); *B42D 25/23* (2014.10); *B42D 25/24* (2014.10); *B42D 25/29* (2014.10); *B42D 25/355* (2014.10); *B42D 25/382* (2014.10); *B42D 25/387* (2014.10)

(58) Field of Classification Search

CPC ........ B42D 25/46; B42D 25/21; B42D 25/23; B42D 25/24; B42D 25/29; B42D 25/355; B42D 25/382; B42D 25/387; B42D 25/45

USPC ....... 283/67, 72, 74, 75, 77, 91, 94, 98, 901

See application file for complete search history.

(56) References Cited

FOREIGN PATENT DOCUMENTS

| | | | |
|---|---|---|---|
| GB | 2076337 | 12/1981 | |
| GB | 2542783 | 4/2017 | |
| GB | 2542786 | 4/2017 | |
| WO | WO 2008/110163 | 9/2008 | |
| WO | WO 2009/056351 | 5/2009 | |
| WO | WO-2009056351 A1 * | 5/2009 | ......... B29C 45/0003 |
| WO | WO 2010/110370 | 9/2010 | |
| WO | WO 2012/143746 | 10/2012 | |
| WO | WO 2014/161667 | 10/2014 | |

OTHER PUBLICATIONS

International Searching Authority: International Search Report and Written Opinion, Intl. App. No. PCT/EP2021/066002 (Oct. 14, 2021).

* cited by examiner

COMPOSITE SECURITY ELEMENT

PRIORITY

This application is the U.S. national phase entry of Intl. App. No. PCT/EP2021/066002 filed on Jun. 14, 2021, which claims priority from GB2009076.7 filed on Jun. 15, 2020. The entire contents of PCT/EP2021/066002 and GB2009076.7 are incorporated herein by reference.

TECHNICAL FIELD

This invention relates to a composite security element. More particularly (though not exclusively) the invention relates to a composite security element, such as for application to various kinds of identification (ID) or security documents or articles, which comprises a plurality of discrete security components integrated together to form a complete security element that is applied onto or incorporated into an identification or security document or article. The invention also relates to a method of making such a composite security element, and to an identification (ID) or security document or article including one of more such composite security elements.

BACKGROUND AND PRIOR ART

Security elements are widely used for identification, authentication or protection of various documents, items or objects, including ID (identification) cards, passports, visas, driving licenses, credit and debit cards, banknotes, securities, certificates, tickets, branded goods, and various other items whose value or nature benefits from an added security feature.

Security features, often of the nature of optical security elements, are frequently incorporated as, or so as to form, security devices in or on one or more structural layers of documents or other sheet-like or flat items, especially those which at least partly involve printing, such as ID cards, passports, visas, driving licenses, credit and debit cards, banknotes, securities, certificates, tickets, and suchlike, and such security features enable or assist the identification or authentication of such documents or items—or their owner—or may be useful for some other security-related purpose.

However, with ever increasing needs for ever more advanced and/or new types of security features that are less prone to counterfeiting and permit higher degrees of security identification, authentication or verification, known optical (and other) security features only go so far, and many fail to meet the high or new demands of such security features that are increasingly being required in the industry. Furthermore, although in certain known security feature-based applications this issue can to some extent be addressed by the use of additional encrypted features or special unnatural visual effects or their combinations, such alternative security elements are at best only a partial solution to the problem and often lead to unnecessarily complex security structures that are expensive to produce and apply and are overly difficult or complicated to read or view.

Thus, it is a primary object of the present invention to address this shortcoming in the art and to provide a new and improved, yet still relatively cheap and easy to apply, form of security feature or device usable in a variety of identification, authentication or security scenarios, e.g. in ID (identification) cards, passports, visas, driving licenses, credit and debit cards, banknotes, securities, certificates, tickets, branded goods, and various other valuable items, and which is capable of providing enhanced levels of identification/authentication/security capability.

SUMMARY OF THE INVENTION

Accordingly, in a first aspect the present invention provides a security element comprising a plurality of superposed layers and a security image or object comprising a plurality of discrete security components, each said discrete security component constituting or providing a portion of the complete security image or object, which portion is less than the whole of the security image or object, wherein each said discrete security component is provided or formed on or within a respective one of the said plurality of superposed layers of the element.

In a second aspect the present invention provides an object, such as an ID (identification) card, passport, visa, driving license, credit or debit card, banknote, security, certificate, ticket, other ID or security document, or item of merchandise, including or having applied thereto at least one security element according to the first aspect of the invention or any embodiment thereof.

In a third aspect the present invention provides a group of two or more objects, such as any two or more of any of an ID (identification) card, passport, visa, driving license, credit or debit card, banknote, security, certificate, ticket, other ID or security document, or item of merchandise, each object including or having applied thereto at least one security element according to the first aspect of the invention or any embodiment thereof, wherein the security image or object comprised in each respective security element constitutes a respective part of, less than the whole of, a macro or larger security image or object, whereby the macro or larger security image or object is distributed or split across the two or more objects.

In a fourth aspect the present invention provides a method of making a security element according to the first aspect of the invention or any embodiment thereof, the method comprising:

(i) providing a plurality of layers, each layer being provided with or having formed thereon or therewithin a respective one of a plurality of discrete security components, each said discrete security component constituting or providing a portion of a complete security image or object, which portion is less than the whole of the said security image or object; and (ii) superposing the said plurality of layers together to form the security element.

Thus, in its broadest sense the invention lies in the creation of a plural-component complete security image or object whose individual security components are each contained in and provided by a different discrete superposed layer of the security element, so that the complete security image or object is viewable or detectable for its intended security purpose by the coming together or integration of the image or object's constituent discrete security components, derived from the superposed discrete layers, upon the components' respective individual portions (each of which is less than the whole) of the image or object being rendered or observed or detected collectively.

For the purpose of viewing or detecting the complete security image or object for its intended security purpose, it may be so viewed or detected under or from or at one or more predefined or selected viewing/detection conditions. Such predefined or selected viewing/detection conditions may be selected from:

(i) one or more predefined or selected viewing/detection directions, or
(ii) one or more predefined or selected viewing/detection angles, or
(iii) one or more predefined or selected viewing/detection conditions of light wavelength or frequency, or
(iv) one or more predefined or selected viewing/detection conditions of light polarisation, or
(v) one or more predefined or selected detection conditions of touch (e.g. contact by a human finger) or other physical contact by a detector device, or
(vi) any combination of any two or more of the above (i) to (v).

As used herein, the term "optical security element" is to be construed broadly and means any physical or functional device, apparatus, object, item or thing that relies on optics or the manipulation or effects of electromagnetic radiation for, and is designed and intended for use in connection with, one or more security purposes, e.g. for identification, authentication or protection purposes of an item of property or some other object, item or thing. Such a "device" may be a physical thing per se which may be incorporated into or included in or on the structure of the item, object or thing whose security is to be so effected, or it may be an inherent part, portion or feature of the item, object or thing itself whose security is to be so effected.

In many practical embodiments of the above-defined method, the step (ii) of superposing the plurality of layers of the element may further include, or be followed by, bonding the said plurality of layers together.

In some such embodiments, the superposed and bonded layers may constitute layers of a complete security element that may be subsequently or simultaneously applied onto or into an object, such as an ID (identification) card, passport, visa, driving license, credit or debit card, banknote, security, certificate, ticket, other ID or security document, or item of merchandise, that is to include or have applied thereto the resulting complete security element. However, in other such embodiments the superposed and bonded layers may constitute layers of the object itself, such as an ID (identification) card, passport, visa, driving license, credit or debit card, banknote, security, certificate, ticket, other ID or security document, or item of merchandise, that is to include or have applied thereto the resulting complete security element, in which case the step (ii) of superposing and optionally bonding the said plurality of layers together may be a step in the overall production or manufacture of the object itself.

In many practical embodiments of the above-defined method, the step (ii) of superposing the plurality of layers of the element may include or be preceded by a step of aligning at least one pair of neighbouring layers, optionally or especially all the layers of the plurality, relative to each other, such that the respective discrete security components provided or formed thereon or therein are correctly positioned or aligned relative to each other such that they form their correct predetermined respective portions of the complete security image or object when the image or object is viewed or detected for its security purpose.

For the purpose of such alignment, in some embodiments of the invention the or each layer containing or carrying a respective discrete security component may include alignment means for aligning the or each said layer with at least one neighbouring or adjacent layer, or with one or more other layers of the plurality, relative to each other, whereby the respective discrete security components provided or formed on or in the respective layers are correctly positionable or alignable relative to each other using said alignment means so as to form their correct predetermined respective portions of the complete security image or object when the image or object is viewed or detected for its security purpose.

The said alignment means may comprise mechanical alignment means or optical alignment means.

For example, suitable mechanical alignment means may comprise (i) one or more first guidance features being one or more holes, apertures, slits, recesses, grooves, designated edge(s) of layer materials or rolls of layer materials (e.g. designated one or more edges of sheets or films or foils of layer carrier materials or of rolls of layer carrier materials), or other surface formations or surface discontinuities which are formed on one of the at least one neighbouring or adjacent layers or other layers of the plurality, and (ii) one or more second guidance features being one or more corresponding guidance holes, apertures, slits, recesses, grooves, designated edge(s) of layer materials or rolls of layer materials (e.g. designated one or more edges of sheets or films or foils of layer carrier materials or of rolls of layer carrier materials), or other surface formations or surface discontinuities, or one or more corresponding guidance pins, spigots, lugs, ribs, tongues, protuberances, or other protruding surface formations which are formed on another of the at least one neighbouring or adjacent layers or other layers of the plurality, wherein respective pairs of the said first and second guidance features are mechanically interengageable or alignable with each other.

Suitable optical alignment means may comprise one or more optical indicia, e.g. one or more optical marks, lines, crosses, or suchlike, provided on one of the at least one neighbouring or adjacent layers or other layers of the plurality and also on at least one other one of the at least one neighbouring or adjacent layers or other layers of the plurality, wherein respective pairs of the said optical indicia in different layers are optically alignable with each other. Optical alignment means may alternatively be provided by one or more designated edges of layer materials or rolls of layer materials (e.g. designated one or more edges of sheets or films or foils of layer carrier materials or of rolls of layer carrier materials) used to construct the security element.

In embodiments of the invention the complete security image or object made up of, especially upon its viewing or detection for its security purpose, the plurality of discrete security components may comprise or be constituted by any desired image, design, picture, logo, emblem, pattern, artistic work, combination of one or more alphanumeric characters, or other object, especially for example one that is suitably unique and/or complex that its composition into its whole, upon its viewing or detection, by the coming together or integration of its constituent discrete security components serves to render the security image or object identifiable and confirmable for its intended security purpose.

In embodiments the complete security image or object, especially upon its viewing or detection for its security purpose, may be, at least in part, a two-dimensional or a three-dimensional image or object. Alternatively, one or more selected portions of the complete security image or object, especially upon its/their viewing or detection for its/their security purpose, may be two-dimensional, and/or one or more other selected portions of the complete security image or object, especially upon its/their viewing or detection for its/their security purpose, may be three-dimensional.

In many embodiments of the invention in its various aspects, the or each layer of the security element may be formed of a material that is substantially transparent to light.

More particularly, in some such embodiments the or each layer of the security element may be transparent to light only in, or in at least, that or those portion(s) of the layer which do not contain or are provided with the respective discrete security component that is provided by that respective layer.

Suitable such materials for forming the or each layer of the security element may include, for example, various polymer materials, especially one or more polycarbonates. Such layer materials, which may be the same as or different from each other in the various layers of the element, may for example be provided in the form of sheets, films, foils, strips or plates, e.g. each independently of the other(s) having a thickness in the approx. range of from about 5 or 10 or 20 or 25 μm up to about 250 or 500 or 1000 μm. Such layer(s) may be generally substantially rigid or such layer(s) may be flexible (e.g. to allow a degree of bending or flexibility to facilitate its/their affixation to a non-planar object or portion of an object).

In many embodiments of the invention in its various aspects, each of at least one of the discrete security components in the respective layers of the security element may be formed of or provided as a security component which has, as compared with at least one other of the discrete security components in the respective layers, one or more of:

(i) a different construction, (ii) a different manner of formation or application, (iii) a different manner of viewing or detection (especially different manners of sensory detection), (iv) a different visual appearance, or (v) any combination of the above different characteristics.

In some such embodiments, especially for example those in which a degree of security is to be optimised so that risks of forgery or counterfeiting and the like are minimised, each of at least one of the discrete security components in the respective layers of the security element may be formed of or provided as a security component which has, as compared with all (or substantially all) of the others of the discrete security components in the respective layers, one or more of:

(i) a different construction, (ii) a different manner of formation or application, (iii) a different manner or means of viewing or detection (especially different manners of sensory detection), (iv) a different visual appearance, or (v) any combination of the above different characteristics.

By way of example:

(i) different inherent constructions of discrete security components may be provided by:
  - holograms, e.g. one or more holographic (e.g. rainbow or achromatic) images recorded holographically within the optical material of the respective layer and recreatable under appropriate transmitted and/or reflected light, as opposed to
  - diffractive optical relief (or grating) feature(s) or region (s) formed on a surface (or in a surface region) of the respective layer which form(s) one or more particular image(s) through optical diffraction under appropriate transmitted and/or reflected light, as opposed to
  - various types of surface printing or embossing or stamping or nano-imprinting lithography, e.g. visible surface printing using various colours in the visible region of the electromagnetic spectrum, IR-visible (infra-red-visible) printing, or UV-visible (ultraviolet-visible) printing;

(ii) different manners of formation or application of discrete security components may be provided by:
  - different types of holograms per se, e.g. recreatable under different specified lighting conditions or lighting characteristics, or
  - different forms of diffractive optical relief per se, e.g. which form different images through optical diffraction under different lighting conditions of transmission and/or reflection, or
  - different types of surface embossing, stamping, printing or nano-imprinting lithography per se, e.g. embossing or stamping of various known types, or visible printing using various colours in the visible region of the electromagnetic spectrum, or IR-visible (infrared-visible) printing, or UV-visible (ultraviolet-visible) printing;

(iii) different manners or means of viewing or detection, especially sensory detection, of discrete security components may be provided by one security component being visible and identifiable visually, whereas another security component may be tactile and identifiable by means of touch or mechanical detection, such as by virtue of being composed of or containing one or more raised or protruding (or alternatively impressed or recessed) edges, lines, areas, regions, spots or dots, patterns or other surface features that disrupt a smooth or planar surface of the respective layer;

(iv) different visual appearances of discrete security components may be provided by different visual appearances when viewed by a viewer, e.g. discrete security components with different colours (i.e. different wavelengths or frequencies of light that forms or is reflected from each respective component), or discrete security components with different intensities or brightnesses (i.e. different intensities or brightnesses of light that forms or is reflected from each respective component), or discrete security components visible under different polarisations (e.g. directional or phase polarisations) of incident light, or discrete security components with different appearances or compositions depending on different viewing angles by which they are viewed by a viewer (e.g. when viewed from a face-on direction, i.e. a direction normal to a planar surface or surface portion that contains the security component in question, as opposed to when viewed from a viewing angle of from about 0 or 1 or 2 up to around 10 or 20 or 30 or 40 or 50 or 60 or 70 or 80 or 85 or 88 or 89 or 90° away from that normal direction).

For practising various embodiments of security element according to the invention, suitable methods, techniques and apparatuses that may be used for creating or applying any of the above various kinds of holograms, optical diffractive relief features, and types of surface embossing and surface printing will be well-known in the art and will be widely available and well understood by persons skilled in the art.

In some embodiments of the invention at least one discrete security component in a given respective layer of the element may be laterally displaced relative to at least one other discrete security component in at least one other respective layer, optionally in at least one other respective neighbouring or adjacent layer, whereby both discrete security elements in both of said respective layers of the element are viewable or detectable when the complete security image or object is viewed or detected, especially when viewed or detected under or from or at its one or more predefined or selected viewing/detection conditions.

Thus, in some such embodiments as in the preceding paragraph, it may be that when the complete security image or object is viewed or detected, especially when viewed or detected under or from or at its one or more predefined or selected viewing/detection conditions, at least one discrete security component in a given respective layer of the element appears connected to or abutting or contacting or contiguous with at least one other discrete security component in at least one other respective layer of the element, optionally in at least one other respective neighbouring or adjacent layer of the element.

In some such embodiments as in the preceding two paragraphs it may even be the case that each one of the discrete security components in each of the respective layers of the element may be laterally displaced relative to each other one of the discrete security components in the other respective layers of the element, whereby all the discrete security elements in all the respective layers of the element are viewable or detectable when the complete security image or object is viewed or detected, especially when viewed or detected under or from or at its one or more predefined or selected viewing/detection conditions.

Thus, in some such embodiments as in the preceding paragraph, it may be that when the complete security image or object is viewed or detected, especially when viewed or detected under or from or at its one or more predefined or selected viewing/detection conditions, each one of the discrete security components in each of the respective layers of the element appears connected to or abutting or contacting or contiguous with each other one of the discrete security components in the other respective layers of the element.

However, in certain other embodiments, still within the scope of the invention, it may be possible for at least one discrete security component in a given respective layer of the element to be laterally positioned or located in its respective layer, relative to the position or location of at least one other discrete security component in at least one other respective layer, optionally in at least one other respective neighbouring or adjacent layer, such that when the complete security image or object is viewed or detected, especially when viewed or detected under or from or at its one or more predefined or selected viewing/detection conditions, the said respective discrete security elements appear overlapping or overlaid with each other.

In embodiments of the invention, although it may often be the case that each respective discrete security component of the plurality is contained within its own unique respective layer of the element distinct from the other respective layers that each contain a respective one of the other discrete security components of the plurality, it may be that in certain embodiment security elements still within the scope of the invention, any one or more individual layers of the element may contain therewithin more than one discrete security component of the overall plurality thereof. Thus, such embodiments are still within the scope of the invention provided that at least two or more of the overall plurality of discrete security components are provided or formed in respective different ones of at least two or more individual layers of the element.

In some embodiments of the invention the security image or object comprised in the security element may constitute a substantially entire or substantially whole such security image or object that is contained in its entirety in a single given object, e.g. an ID (identification) card, passport, visa, driving license, credit or debit card, banknote, security, certificate, ticket, other ID or security document, or item of merchandise, which includes or has applied thereto the said security element. In this manner, in such embodiments a given single security element may be provided on or applied to either a selected one or more parts of or even substantially over the whole of an area of (especially an area of a given face or page of) a single such ID or other security document or object that the security element is intended to protect. In practice this may thus significantly enhance or increase the value of such a document's or object's security, unlike current security features, which are often located in only a part (often only a small part) of the overall area of the security document/object (e.g. as is typically the case in the application of a security hologram to just a part of a photo on an ID card).

However, in other embodiments of the invention the security image or object comprised in the security element may constitute just a part of, less than the whole of, a larger or more extensive or macro security image or object, so that the larger or more extensive or macro security image or object is, in effect, distributed or split or spread across a plurality of security elements each of which is applied to a respective one of two or more different objects, e.g. any two or more of any of an ID (identification) card, passport, visa, driving license, credit or debit card, banknote, security, certificate, ticket, other ID or security document, or item of merchandise. That larger or more extensive or macro security image or object may be made up of a plurality of repeated identical smaller security images or objects, or alternatively or additionally it may be made up of a single more complex larger or more extensive or macro security image or object whose individual parts that are distributed or split or spread across the plurality of security elements are different from one another. In this manner, in such embodiments such a larger or more extensive or macro security image or object may be spread across and as between a plurality of different security documents or items in such a manner that individual parts of that larger or more extensive or macro security image or object are provided by respective ones of the plurality of security elements applied to respective ones of the plurality of security documents/items.

Indeed, in some such embodiments as in the preceding paragraph each of (or at least one or more of) the respective security elements applied to respective security documents/items may be formed with substantially the same plural-layer construction such that the same security image or object is provided by each one of (or at least one or more of) the plurality of security elements (and thus the same security image or object is provided by each one of (or at least one or more of) the plurality of security documents/items), whereby a given unique security image or object is, in effect, repeated on different ones of the plurality of security documents/items.

Alternatively or additionally, in other such embodiments as in the preceding-but-one paragraph each of (or at least one or more of) the respective security elements applied to respective security documents/items may be formed with its own respective plural-layer construction such that each one of (or at least one or more of) the plurality of security elements (and thus each one of (or at least one or more of) the plurality of security documents/items) provides a respective security image or object of a different appearance or content or composition from the other(s) (or at least one or more of the other(s)) thereof, whereby different parts of a single or more complex larger or more extensive or macro security image or object are, in effect, distributed or split or spread across plural ones of the plurality of security elements on the plurality of different ones of the plurality of security documents/items. More particularly and usefully in such embodiments, it may be that adjacent parts of adjacent ones of plural ones of the plurality of security elements are designed to match or connect with one another in a unique way (e. g upon visual inspection or by detection using an apparatus), in order to enhance the degree of overall security or protection provided by the plurality of security elements of the plurality of security documents/items when considered or examined as a set.

Within the scope of this specification it is envisaged that the various aspects, embodiments, examples, features and alternatives, and in particular the individual constructional or operational features thereof, set out in the preceding paragraphs, in the claims and/or in the following description and accompanying drawings, may be taken independently or in any combination of any number of same. For example, individual features described in connection with one particular embodiment are applicable to all embodiments, unless expressly stated otherwise or such features are incompatible.

BRIEF DESCRIPTION OF THE DRAWINGS

One or more embodiments of the present invention in its various aspects will now be described in detail, by way of example only, with reference to the accompanying drawings, in which:

FIG. 4 shows schematically, in perspective, the manner in which the various layers of the ID card, each carrying its respective discrete security component of the complete flower security image as visible in FIG. 2, are superposed and bonded together into a stack, thereby collectively creating the complete flower security image when the ID card is viewed face-on.

DETAILED DESCRIPTION OF EMBODIMENTS

Figure 1:
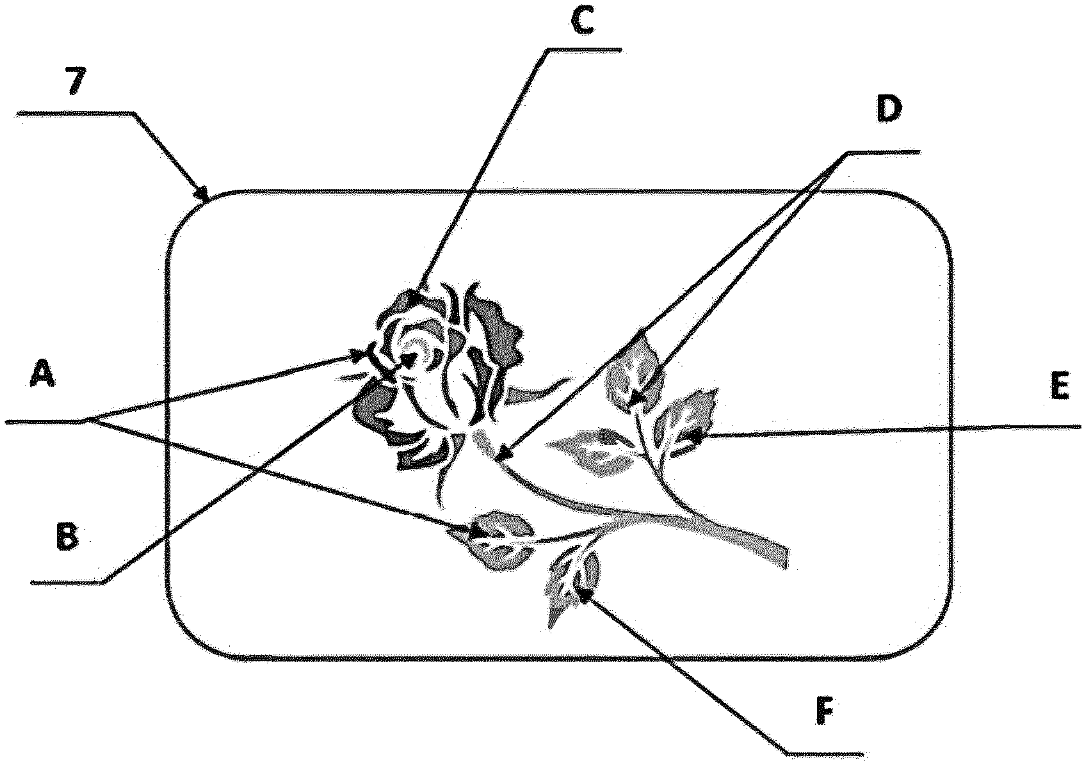
FIG. 1 is a face-on view of an ID card including an example of one embodiment of composite security element according to the invention, which in this example is based on a security image in the form of a design of a flower.

Referring firstly to FIG. 1, this shows a face-on view of an ID card 7 including an example of one embodiment of composite security element according to the invention. In this illustrated example the composite security element takes the form of a security image represented by a picture of a flower, which takes up a major proportion of the facial area of one side of the card 7. The ID card 7—or at least that portion of its overall thickness towards its outermost faces—is composed of several superposed and bonded layers, e.g. of a polycarbonate substrate material, e.g. each of from around 25 or 50 up to around 100 or 250 μm thickness, and each of the layers contains a given one of the several individual discrete security components that together make up the total composite image of the flower when viewed, or otherwise sensed, from its face-on viewing direction.

In the composite image, each of the components of the flower is composed of a differently constructed and/or differently applied and/or differently detectable component as compared with the flower's other components, as a result of which each component of the flower has a visual appearance which is different from, and/or is able to be detected sensorily by a different technique from, that of each of the other components of the flower. More particularly:

- the colour(s) and details of the petals C are formed by a rainbow hologram contained within the material of that respective layer,
- the edges A of the petals and of the edges of the leaves and main stem are defined by tactile surface relief lines,
- the centre B of the flower is created using colour switch printing that changes colour according to the viewing angle,
- the stems D of the main flower and the internal veins of the leaves are achromatic holographic images,
- some leaves E are filled with prints with colours visible under IR light,
- other leaves F are filled with prints with colours visible under UV light, and
- optionally, some of the internal venous structure D of the leaves may be defined (or additionally defined) by other or known security printing features/techniques (e.g. lines of guilloches, etc).

Figure 2:
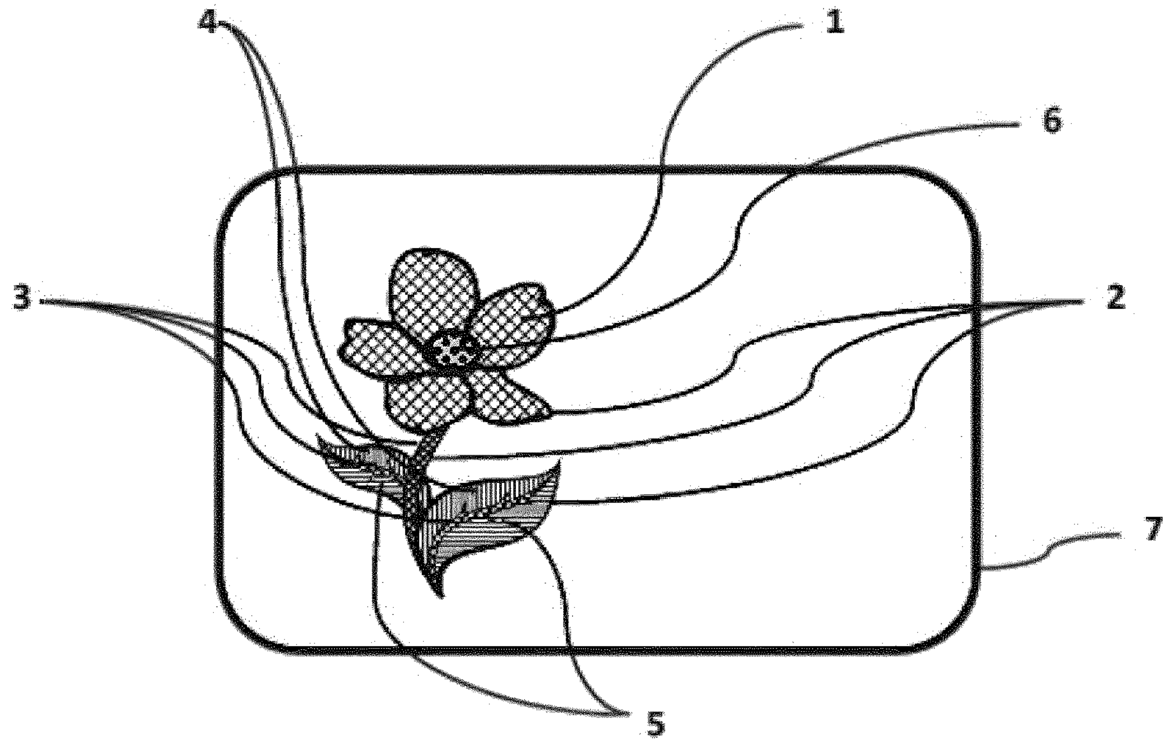
FIG. 2 is a face-on view of a similar ID card to that of FIG. 1, but showing an alternative design of flower security image as the composite security element, and showing the various discrete security components of the flower image embodied in the security element in further detail and ready for explaining how—with reference to FIGS. 3(*a*)-3(*d*) which follow—how the discrete security components of the flower in the various layers of the ID card combine together to form the complete flower security image therein.
Figure 3A:
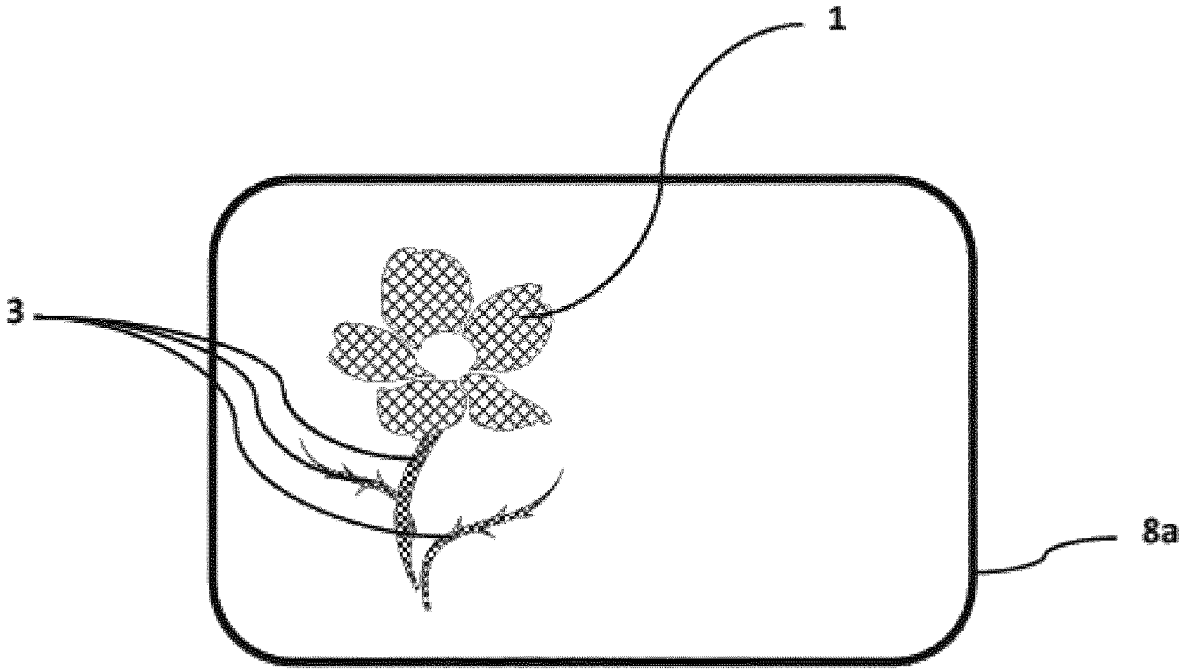
FIGS. 3(*a*)-3(*d*) are face-on views of the respective layers of the ID card of FIG. 2, showing the respective discrete security components of the complete flower security image that each respective layer of the ID card is provided with or has formed therein/thereon.
Figure 3B:
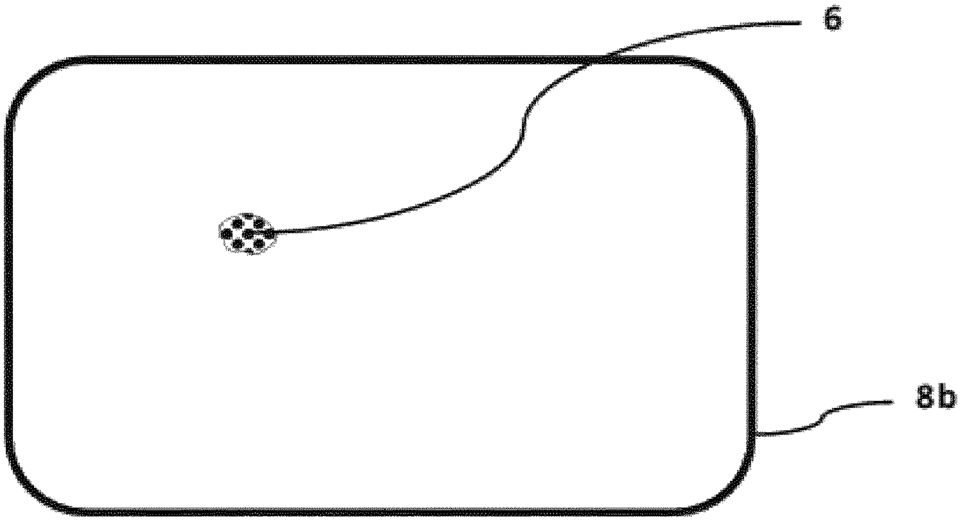
Figure 3C:
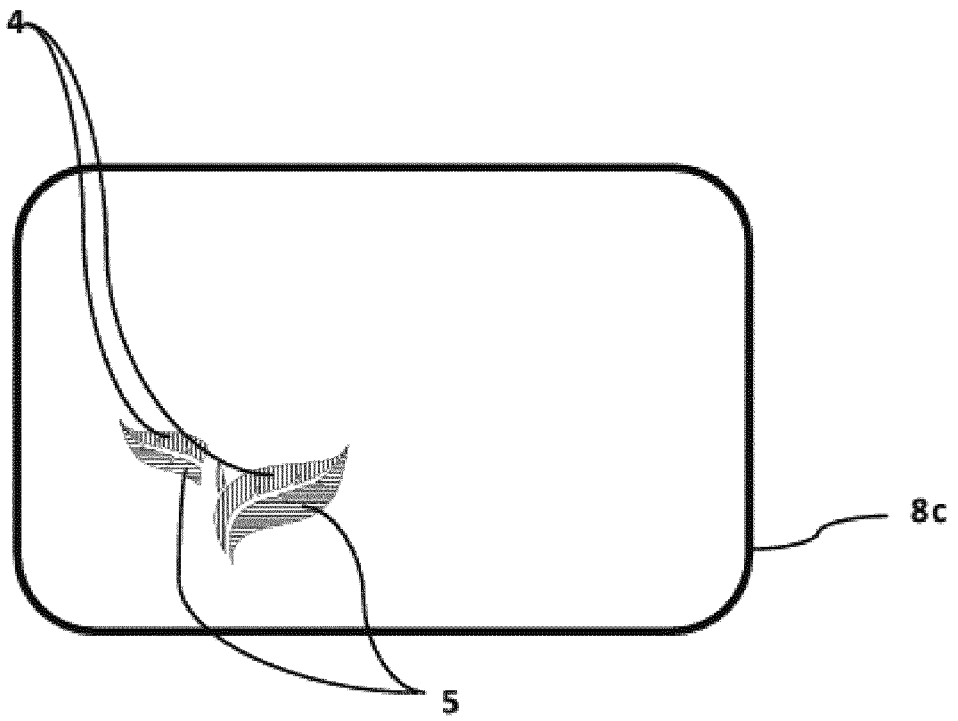
Figure 3D:
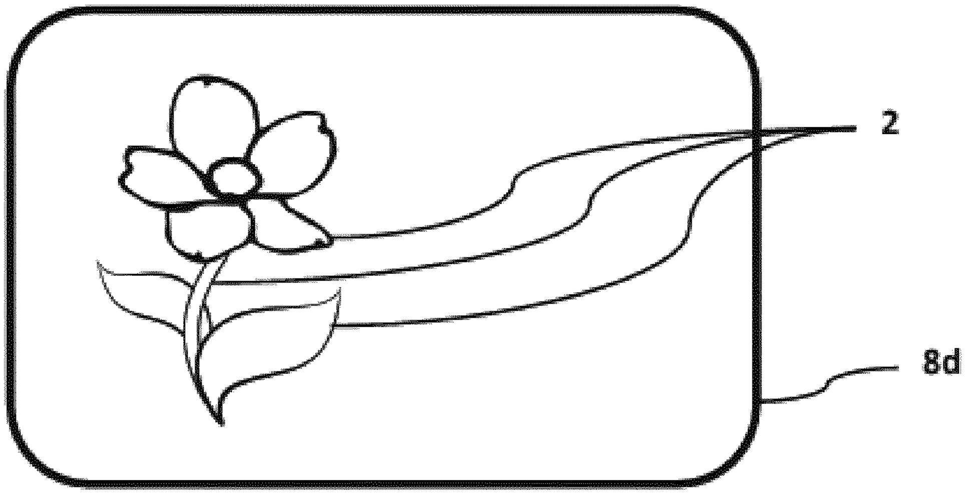

FIG. 2 shows a similar yet corresponding ID card 7 to that of FIG. 1, but in which the flower security image has a modified design. FIG. 2 shows the overall view of the flower security image when the card 7 is viewed face-on, with the individual neighbouring ones of the discrete components 1, 2, 3, 4, 5, 6, 7 of the flower being visible side-by-side and abutting or contacting one another as appropriate so as to collectively make up the complete image of the flower with its correct visual appearance for its intended security purpose. Furthermore, each individual discrete component 1, 2, 3, 4, 5, 6, 7 of the flower is formed by, and thus is visible or otherwise detectable by a different technique or physical process, thereby optimising the uniqueness and complexity of the overall security image so that the degree of security afforded by the security element is optimised and the risks of forgery or counterfeiting and the like afforded by the security element are minimised.

FIGS. 3(*a*)-3(*d*) shows the four individual polycarbonate-based sheet layers 8*a*, 8*b*, 8*c*, 8*d* which are superposed and bonded together to make up the complete ID card 7, each individual sheet layer containing one or more respective ones of the individual discrete security components 1, 2, 3, 4, 5, 6, 7 of the flower.

Thus, in this illustrated example embodiment of ID card 7:

- 1=Security rainbow hologram/DOVID (Diffractive Optically Variable Image Device)—forming the bodies of the petals of the flower (contained in sheet layer 8*a*);
- 2=Tactile security feature (raised solid lines, detectable by human finger touch or by means of a detection device)—defining the outlines of the flower head and outlines of the leaves) (contained in sheet layer 8*d*);
- 3=3D holographic optical element—forming the bodies of the leaves of the flower (contained in sheet layer 8*a*);
- 4=IR visible printing—forming certain parts of the leaves of the flower (contained in sheet layer 8*c*);

5=UV visible printing—forming other certain parts of the leaves of the flower (contained in sheet layer 8*c*);

6=Colour switch printing—forming the centre of the flower (contained in sheet layer 8*b*).

Figure 4:
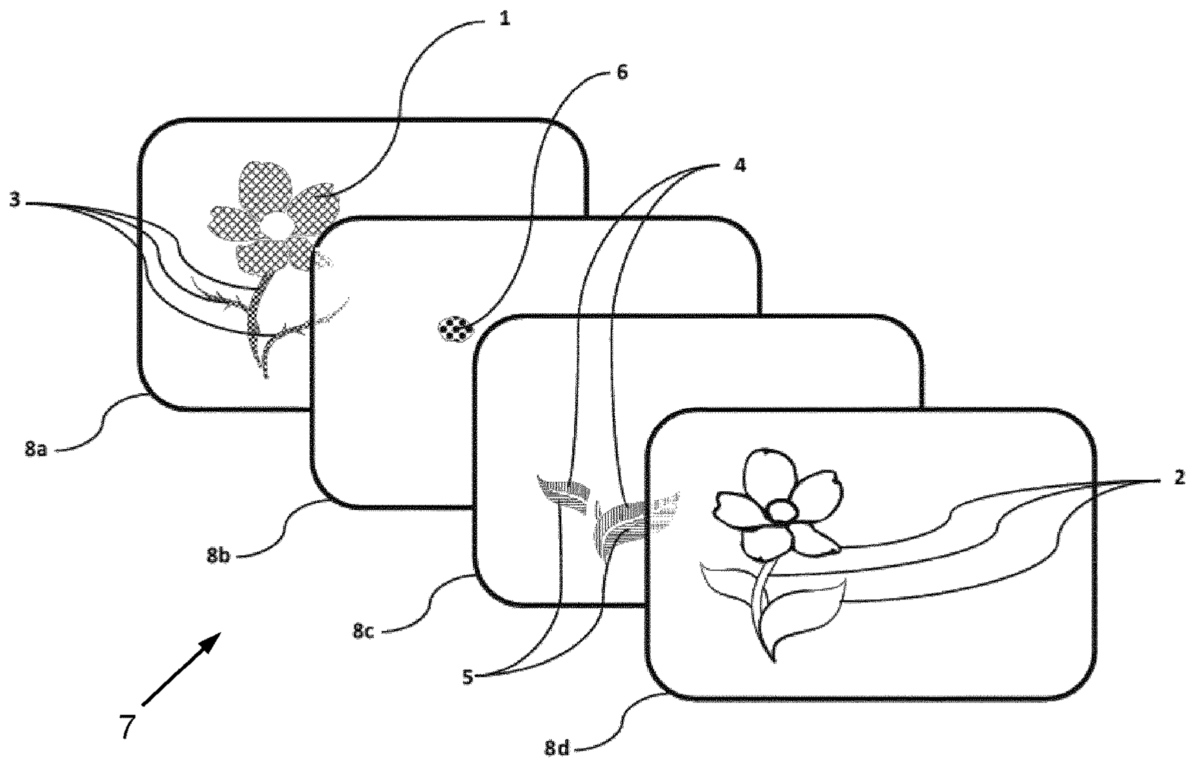

FIG. 4 illustrates the manner in which the individual sheet layers 8*a*, 8*b*, 8*c*, 8*d* of the ID card 7 are united together in a superposed fashion and bonded together to form the complete ID card 7. This united and final bonding together of the various superposed sheet layers 8*a*, 8*b*, 8*c*, 8*d* may be accomplished by application of appropriate elevated temperature and/or pressure, as may be dictated by the specific material(s) from which the various layers are formed. For instance in the case of polycarbonate layer materials, uniting and bonding temperatures in the approx. range of from about 150° C. to about 250° C. may be suitable, in combination with pressures of from about 100 psi (~$689\times10^3$ N/$m^2$) to about 250 psi (~$1724\times10^3$ N/$m^2$).

For effecting this uniting and final bonding together of the various layers 8*a*, 8*b*, 8*c*, 8*d* into an assembled stack, after initially physically arranging the individual layers 8*a*, 8*b*, 8*c*, 8*d* into a stack with the layers in their correct relative alignments and positions relative to each other, the stack may be first fixed in its united but pre-bonded condition, for example by spot welding at several points, thus ensuring the handling stability of the stack in the ensuing further steps of the uniting and bonding procedure. This may then be followed by bonding and uniting/lamination under the elevated temperature and pressure, as a result of which the individual layers 8*a*, 8*b*, 8*c*, 8*d* become bonded and laminated together into the resulting complete body of the ID card 7, with the complete composite security image of the flower visible and/or detectable from a face-on direction.

To assist in the initial correct relative positioning and alignment of the various sheet layers 8*a*, 8*b*, 8*c*, 8*d* relative to each other in the final ID card 7, each sheet layer 8*a*, 8*b*, 8*c*, 8*d* may include, e.g. at or adjacent one or more of its edges or corners, appropriate optical indicia, e.g. one or more optical marks, lines, crosses, or suchlike (not actually shown in the FIG.) (or optionally alternatively appropriate interengageable mechanical alignment features in the form of holes, apertures, slits, recesses, grooves, or other surface formations or surface discontinuities, and/or pins, spigots, lugs, ribs, tongues, protuberances, or other protruding surface formations) provide on neighbouring/adjacent or other different ones of the various sheet layers. The precise method of application and manner of use of such optical or mechanical alignment features (e.g. involving a camera system) may be in accordance with known alignment techniques as already used in the art of multi-layer optical elements of other known types.

As an alternative to the employment of the above optical or mechanical alignment features, it may instead be sufficient for the necessary initial correct alignment of the various sheet layers 8*a*, 8*b*, 8*c*, 8*d* of the ID card 7 to be achieved by virtue of the outer peripheries of each of the layers 8*a*, 8*b*, 8*c*, 8*d* being of the same size and shape as each other, and the precise position or location of the respective discrete security component in or on each sheet layer being sufficiently accurate (e.g. within a tolerance range of from about 0.001 mm up to about 0.5 or 0.8 or 1 mm tolerance of accuracy), so that it is a simpler matter for the various sheet layers 8*a*, 8*b*, 8*c*, 8*d* to be superposed into a stack with their peripheral edges all aligned with one another (optionally with the aid of the human eye or a camera system), with the result that the individual discrete security components in/on the various layers are themselves then inevitably also correctly positioned and aligned relative to each other. This means of achieving correct alignment of the various sheet layers may be particularly useful in the case where the various layers 8*a*, 8*b*, 8*c*, 8*d* are layers of the object itself (in this case the ID card 7) which is to have the security image applied to one of its faces.

In some practical implementations of other embodiments of the invention in the context of especially ID cards or other ID or security documents, it may be possible for a plurality of such ID cards/documents to be assembled and manufactured together simultaneously in a single enlarged matrix sheet form, by virtue of each respective sheet layer being large enough to contain appropriately positioned/located respective discrete security components of the plurality of ID cards/documents, and then after bonding/lamination together of the various sheet layers the individual ID cards/documents can be cut off therefrom so as to form the resulting plurality of individual identical cards/documents cut from the sheet product.

Figure 5:
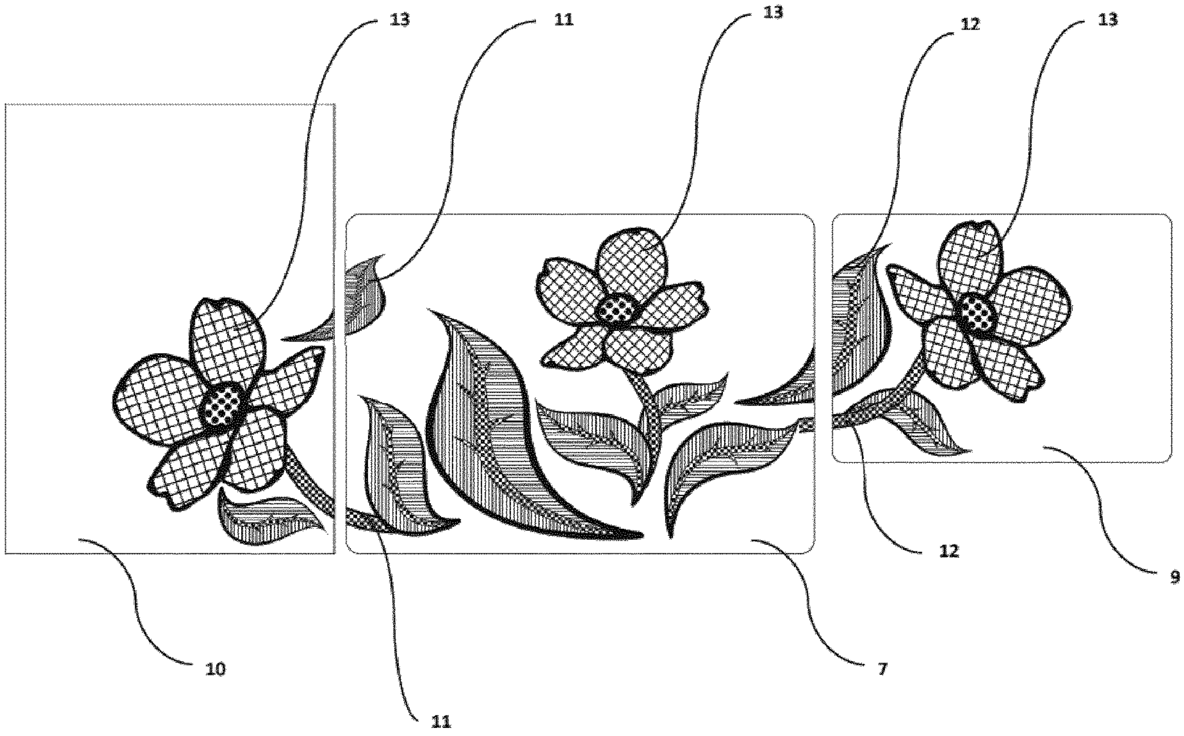
FIG. 5 is a schematic view of a group or collection of different ID or other security documents, each carrying a respective security element that constitutes part of a macro or larger security image or object, whereby the macro or larger security image or object is spread, distributed or split across the whole group of ID or other security documents.

Turning to FIG. 5, this shows an example of an embodiment of the invention being applied to a group or set of different ID documents 7, 9, 10 (e.g. an ID card 7, a driving license 9 and a passport 10), in which a single given, but more complex, larger or macro security image is spread or distributed across all three ID documents 7, 9, 10. As shown by way of example here, the more complex, larger or macro security image is achieved by repeating the same part of the blossom flowers 13 on each one of the ID documents 7, 9 and 10. Yet at the same time a unique overall design of flowers is spread across all three ID documents 7, 9, 10 as a set or group, such that selected individual parts of the overall design in one of the ID documents 7, 9 or 10 match up with or are continuations from other selected individual parts of the overall design in a different but adjacent one of the ID documents 7, 9 or 10. For example, the plant leaves 11 continue from document 7 to document 10, and the plant leaves (differently configured from the aforementioned plant leaves) 12 continue from document 7 to document 9. In this manner the group or set of three ID documents 7, 9 and 10 are protected together as a unique collection or set of security documents/items whose enhanced degree of security is embodied in the overall larger and more complex macro security image spread or distributed over all three documents/items 7, 9 and 10.

Throughout the description and claims of this specification, the words "comprise" and "contain" and linguistic variations of those words, for example "comprising" and "comprises", mean "including but not limited to", and are not intended to (and do not) exclude other moieties, additives, components, elements, integers or steps.

Throughout the description and claims of this specification, the singular encompasses the plural unless expressly stated otherwise or the context otherwise requires. In particular, where the indefinite article is used, the specification is to be understood as contemplating plurality as well as singularity, unless expressly stated otherwise or the context requires otherwise.

Throughout the description and claims of this specification, features, components, elements, integers, characteristics, properties, compounds, chemical moieties or groups described in conjunction with a particular aspect, embodiment or example of the invention are to be understood to be applicable to any other aspect, embodiment or example described herein unless incompatible therewith or expressly stated otherwise.

The invention claimed is:

1. A security element comprising a plurality of superposed layers and a complete security image or object comprising a plurality of discrete security components, each said discrete security component constituting or providing a portion of the complete security image or object, which portion is less than a whole of the complete security image or object, wherein each said discrete security component is provided or formed on or within a respective one of the said plurality of superposed layers of the element;

wherein each of at least one of the discrete security components in the respective layers of the security element is formed of or provided as a security component which has, as compared with at least one other of the discrete security components in the respective layers, one or more of features:
- (i) a different construction,
- (ii) a different manner of formation or application,
- (iii) a different manner of viewing or detection, or
- (iv) a combination of any two or more of the above different characteristics (i) to (iii); and wherein each layer of the element includes alignment means for aligning each said layer with at least one neighbouring or adjacent layer, or with one or more other layers of the plurality, relative to each other, whereby the respective discrete security components provided or formed on or in the respective layers are positionable or alignable relative to each other using said alignment means such that the respective discrete security components form the predetermined respective portions of the complete security image or object when the image or object is viewed or detected for a security purpose thereof, wherein the alignment means is selected from:
- (a) mechanical alignment means, comprising one or more first guidance features being one or more holes, apertures, slits, recesses, grooves, or other surface formations or surface discontinuities which are formed on one of the at least one neighbouring or adjacent layers or other layers of the plurality, and (ii) one or more second guidance features being one or more corresponding holes, apertures, slits, recesses, grooves, or other surface formations or surface discontinuities, or one or more corresponding guidance pins, spigots, lugs, ribs, tongues, protuberances, or other protruding surface formations which are formed on another of the at least one neighbouring or adjacent layers or other layers of the plurality, wherein respective pairs of the said first and second guidance features are mechanically interengageable or alignable with each other; or
- (b) optical alignment means, comprising one or more optical indicia provided on one of the at least one neighbouring or adjacent layers or other layers of the plurality and also on at least one other one of the at least one neighbouring or adjacent layers or other layers of the plurality, wherein respective pairs of the said optical indicia in different layers are optically alignable with each other.

2. A security element according to claim 1, wherein:

either (v) the said superposed layers constitute layers of a complete security element that can be subsequently applied onto or into an object that is to include or have applied thereto the said security element; or (vi) the said superposed layers constitute layers of an object itself that is to include or have applied thereto the said security element.

3. A security element according to claim 1, wherein the complete security image or object, upon its viewing or detection for its security purpose, is at least in part, or comprises, a two-dimensional or a three-dimensional image or object.

4. A security element according to claim 1, wherein each layer of the security element is formed of a material that is substantially transparent to light.

5. A security element according to claim 1, wherein each layer of the security element is transparent to light only in, or in at least, portion(s) of that respective said layer which do not contain or are provided with the respective discrete security component that is provided by that respective said layer.

6. A security element according to claim 1, wherein each layer of the security element is formed from, or comprises, a polycarbonate material.

7. A security element according to claim 1, wherein the or each layer of the security element is in a form of a sheet, film, foil, strip or plate, each independently of the other layer(s) having a thickness in a range of from 5 or 10 or 20 μm up to 250 or 500 or 1000 μm.

8. A security element according to claim 1, wherein each of the said at least one of the discrete security components in the respective layers of the security element is formed of or provided as a security component which has, as compared with all or substantially all of the others of the discrete security components in the respective layers, one or more of the features:
- (i) the said different construction,
- (ii) the said different manner of formation or application,
- (iii) the said different manner or means of viewing or detection, or
- (iv) a combination of any two or more of the above different characteristics (i) to (iii).

9. A security element according to claim 1, wherein for one or more respective one(s) of the respective said features (i), (ii) and (iii), following respective one(s) of the respective features (i), (ii) or (iii) is/are present or satisfied:
- (i) different inherent constructions of discrete security components are provided by:
  - holograms, in a form of one or more holographic images recorded within an optical material of the respective layer and recreatable under transmitted and/or reflected light, or
  - diffractive optical relief or grating feature(s) or region (s) formed on a surface or in a surface region of the respective layer which form(s) one or more image(s) through optical diffraction under transmitted and/or reflected light, or
  - various types of surface printing or embossing or stamping or nano-imprinting lithography;
- (ii) different manners of formation or application of discrete security components are provided by:
  - different types of holograms per se, or
  - different forms of diffractive optical relief per se, or
  - different types of surface embossing, stamping, printing or nano-imprinting lithography per se;
- (iii) different manners or means of viewing or detection are selected from (a) sensory detection of discrete security components are provided by one security component being visible and identifiable visually, whereas another security component is tactile and identifiable by means of touch or mechanical detection, or (b) respective different discrete security components are visible under different polarisations of incident light, or by virtue of having different appearances or compositions depending on different viewing angles by which they are viewed by a viewer.

10. A security element according to claim 1, wherein at least one discrete security component in a given respective layer of the element is laterally displaced relative to at least one other discrete security component in at least one other respective layer, or in at least one other respective neighbouring or adjacent layer, whereby both discrete security components in both of said respective layers of the element are viewable or detectable when the complete security image or object is viewed or detected under or from or at one or more predefined or selected viewing/detection conditions, whereby when the complete security image or object is viewed or detected under or from or at the one or more predefined or selected viewing/detection conditions, at least one discrete security component in a given respective layer of the element appears connected to or abutting or contacting or contiguous with at least one other discrete security component in at least one other respective layer of the element, or in at least one other respective neighbouring or adjacent layer of the element.

11. A security element according to claim 10, wherein each one of the discrete security components in each of the respective layers of the element is laterally displaced relative to each other one of the discrete security components in the other respective layers of the element, whereby all the discrete security components in all the respective layers of the element are viewable or detectable when the complete security image or object is viewed or detected under or from or at one or more predefined or selected viewing/detection conditions, whereby when the complete security image or object is viewed or detected under or from or at the one or more predefined or selected viewing/detection conditions, each one of the discrete security components in each of the respective layers of the element appears connected to or abutting or contacting or contiguous with each other one of the discrete security components in the other respective layers of the element.

12. A security element according to claim 1, wherein at least one discrete security component in a given respective layer of the element is laterally positioned or located in its respective layer, relative to the position or location of at least one other discrete security component in at least one other respective layer, or in at least one other respective neighbouring or adjacent layer, such that when the complete security image or object is viewed or detected under or from or at one or more predefined or selected viewing/detection conditions, the said respective discrete security components appear overlapping or overlaid with each other.

13. A security element according to claim 1, wherein:

either (i) each respective discrete security component of the plurality is contained within its own unique respective layer of the element distinct from the other respective layers that each contain a respective one of the other discrete security components of the plurality; or (ii) any one or more individual layers of the element contains therewithin more than one discrete security component of the overall plurality thereof, with a proviso that at least two or more of the overall plurality of discrete security components are provided or formed in respective different ones of at least two or more individual layers of the element.

14. A security element according to claim 1, wherein the security image or object is viewable or detectable for its security purpose by virtue of it being viewable or detectable under or from or at one or more predefined or selected viewing/detection conditions, wherein the said predefined or selected viewing/detection conditions are selected from:

(i) one or more predefined or selected viewing/detection directions, or (ii) one or more predefined or selected viewing/detection angles, or (iii) one or more predefined or selected viewing/detection conditions of light wavelength or frequency, or (iv) one or more predefined or selected viewing/detection conditions of light polarisation, or (v) one or more predefined or selected detection conditions of touch or other physical contact by a detector device, or (vi) any combination of any two or more of the above (i) to (v).

15. An object including or having applied thereto at least one security element according to claim 1, wherein the object is an ID (identification) card, passport, visa, driving license, credit or debit card, banknote, security, certificate, ticket, other ID or security document, or item of merchandise.

16. A group of two or more objects, each object being an object according to claim 15, wherein the complete security image or object comprised in each respective security element constitutes a respective part of, less than a whole of, a macro or larger security image or object, whereby the macro or larger security image or object is distributed or split across the two or more objects.

17. A method of making a security element according to claim 1, the method comprising:

(1) providing a plurality of layers, each layer being provided with or having formed thereon or therewithin a respective one of a plurality of discrete security components, each said discrete security component constituting or providing a portion of a complete security image or object, which portion is less than a whole of the said complete security image or object, wherein each of at least one of the discrete security components in the respective layers is formed of or provided as a security component which has, as compared with at least one other of the discrete security components in the respective layers, one or more of features:

(i) a different construction, (ii) a different manner of formation or application, (iii) a different manner of viewing or detection, or a different manner of sensory detection, or (iv) a combination of any two or more of the above different characteristics (i) to (iii), and wherein each layer of the element includes alignment means for aligning each said layer with at least one neighbouring or adjacent layer, or with one or more other layers of the plurality, relative to each other, whereby the respective discrete security components provided or formed on or in the respective layers are positionable or alignable relative to each other using said alignment means such that they form the predetermined respective portions of the complete security image or object when the image or object is viewed or detected for its security purpose, wherein the alignment means is selected from:

(a) mechanical alignment means, comprising one or more first guidance features being one or more holes, apertures, slits, recesses, grooves, or other surface formations or surface discontinuities which are formed on one of the at least one neighbouring or adjacent layers or other layers of the plurality, and (ii) one or more second guidance features being one or more corresponding holes, apertures, slits, recesses, grooves, or other surface formations or surface discontinuities, or one or more corresponding guidance pins, spigots, lugs, ribs, tongues, protuberances, or other protruding surface formations which are formed on another of the at least one neighbouring or adjacent layers or other layers of the plurality, wherein respective pairs of the said first and second guidance features are mechanically interengageable or alignable with each other; or (b) optical alignment means, comprising one or more optical indicia provided on one of the at least one neighbouring or adjacent layers or other layers of the plurality and also on at least one other one of the at least one neighbouring or adjacent layers or other layers of the plurality, wherein respective pairs of the said optical indicia in different layers are optically alignable with each other; and (2) superposing the said plurality of layers together to form the security element, wherein this step (2) of superposing the plurality of layers of the element includes or is preceded by a step of aligning—by means of the said alignment means—at least one pair of neighbouring layers, or all the layers of the plurality thereof, relative to each other, such that the respective discrete security components provided or formed thereon or therein are positioned or aligned relative to each other such that they form the predetermined respective portions of the complete security image or object when the image or object is viewed or detected for the security purpose thereof.

18. A method according to claim 17, wherein the step (2) of superposing the plurality of layers of the element further includes, or is followed by, bonding the said plurality of layers together.

* * * * *